(12) United States Patent
Gacioch, Jr. et al.

(10) Patent No.: US 7,283,900 B1
(45) Date of Patent: Oct. 16, 2007

(54) WORK VEHICLE STEERING SYSTEM WITH FLOW-METERING CURVE SELECTION AND ASSOCIATED METHOD

(75) Inventors: Michael T. Gacioch, Jr., Dubuque, IA (US); Alvaro Jose Forero, Peosta, IA (US); Lars Althof, Ames, IA (US)

(73) Assignees: Deere & Company, Moline, IL (US); Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 11/684,216

(22) Filed: Mar. 9, 2007

Related U.S. Application Data

(60) Provisional application No. 60/782,111, filed on Mar. 14, 2006.

(51) Int. Cl.
*A01B 69/00* (2006.01)

(52) U.S. Cl. ............................. 701/41; 701/42; 701/50; 180/410

(58) Field of Classification Search .................. 701/41, 701/42, 43, 50; 180/410, 446; 307/9.1–10.2
See application file for complete search history.

(56) References Cited

U.S. PATENT DOCUMENTS

| | | |
|---|---|---|
| RE25,126 E | 2/1962 | Charlson |
| 4,480,971 A | 11/1984 | Swedberg |
| 4,493,622 A | 1/1985 | Miller |
| 4,514,152 A | 4/1985 | Takamatsu |
| 4,531,082 A | 7/1985 | Yoshinada |
| 4,759,182 A | 7/1988 | Haarstad |
| 4,809,586 A | 3/1989 | Gage et al. |
| 4,862,690 A | 9/1989 | Haarstad |
| 4,958,493 A | 9/1990 | Schutten et al. |
| 5,042,250 A | 8/1991 | Carlson |
| 5,050,696 A | 9/1991 | McGovern et al. |
| 5,080,135 A | 1/1992 | Stephenson |
| 5,165,496 A | 11/1992 | Pederson et al. |
| 5,186,211 A | 2/1993 | Stephenson et al. |
| 5,186,212 A | 2/1993 | Stephenson et al. |
| RE34,746 E | 10/1994 | Schutten et al. |
| 5,477,455 A * | 12/1995 | Ishino et al. .................. 701/50 |
| 5,602,735 A * | 2/1997 | Wada .......................... 701/41 |
| 5,620,026 A | 4/1997 | Stephenson et al. |
| 5,634,495 A | 6/1997 | Rasmussen et al. |
| 5,638,864 A | 6/1997 | Haarstad et al. |
| 5,819,532 A | 10/1998 | Wang et al. |
| 6,052,633 A * | 4/2000 | Fukuyama et al. ........... 701/41 |
| 6,076,349 A | 6/2000 | Stephenson et al. |
| 6,318,078 B1 | 11/2001 | Novacek et al. |
| 6,782,698 B2 | 8/2004 | Gehlhoff |

OTHER PUBLICATIONS

"Controller for Electro-hydraulic Steering PVED," Sauer-Danfoss Operation Manual (102 pages) (Jan. 2004).
"VersaSteer™ Technology Steering Control Units," Eaton Corporation, Mar. 2004 (6 pages).
"Steering: Q-Amp," Eaton Corporation, Sep. 1, 2005 (3 pages).

(Continued)

*Primary Examiner*—Richard M. Camby (57) ABSTRACT

A steering system for a work vehicle adjusts the steering ratio in response to changes in the speed of the work vehicle.

17 Claims, 6 Drawing Sheets

OTHER PUBLICATIONS

"New Eaton Steering Control Unit Offers Reduced Installed Costs," Eaton Corporation Press Release, Apr. 23, 2001 (2 pages).

Johan Vanderkamp, "Electro-hydraulic Steering in Off Road Vehicles," Automation Technology for Off-Road Equipment, Jul. 26, 2002, pp. 374-387, Jul. 26-27. Conf. Proceedings.

Iris Poliski, "Easing the Turn," OEM Off-Highway, pp. 38-39, Sep. 1997.

Alan Hitchcox, "New Cat Toll Carrier Follows the Trends," Hydraulics & Pneumatics, Aug. 10, 2006 (2 pages).

"Section 5 Steering System," Downloaded from Internet on May 16, 2006, pp. 5-1 to 5-13.

* cited by examiner

WORK VEHICLE STEERING SYSTEM WITH FLOW-METERING CURVE SELECTION AND ASSOCIATED METHOD

This application claims the benefit under 35 U.S.C. § 119(e) of U.S. Provisional Patent Application 60/782,111, which was filed 14 Mar. 2006 and is hereby incorporated by reference herein.

FIELD OF THE DISCLOSURE

The present disclosure relates to steering systems for work vehicles.

BACKGROUND OF THE DISCLOSURE

As used in this application, the steering ratio is defined as steering output/steering input. The steering input may be, for example, displacement of a joystick or a steering wheel. The steering output may be, for example, change in the steered position of one or more steerable elements (e.g., an articulated section of the vehicle and/or traction elements, such as wheels, of the vehicle), and/or change in the actuator(s) (e.g., hydraulic cylinder(s)) for effecting such change in the steered position of the one or more steerable elements. A larger steering ratio represents a steering system in which a given steering input results in a relatively large steering output whereas a smaller steering ratio represents a steering system in which the given steering input results in a relatively small steering output. Thus, the steering output of a steering system with a larger steering ratio is more "sensitive" to the steering input than a steering system with a smaller steering ratio. Such sensitivity could be particularly noticeable in vehicles set at a higher steering ratio and traveling at relatively high speed.

SUMMARY OF THE DISCLOSURE

According to the present disclosure, there is provided a steering system for a work vehicle. The steering ratio of the steering system is automatically adjustable in response to vehicle speed.

In an aspect, the steering system comprises a steering input device for receiving a steering input and generating a steering input signal representative thereof, a speed sensor for sensing a speed of the work vehicle and generating a speed signal representative thereof, a steering valve, and a controller unit. The controller unit is adapted to: receive the steering input signal and the speed signal, select a flow-metering curve among a plurality of flow-metering curves representing different steering ratios using the speed signal and generate a selected flow-metering curve signal representative of the selected flow-metering curve, determine a desired valve position setting for the steering valve using the steering input signal and the selected flow-metering curve signal, and output a position setting signal so as to command that the steering valve assume the desired valve position setting to effect a corresponding steering output.

Further, the controller unit is adapted to determine a target flow-metering curve among the plurality of flow-metering curves and transition from an initial flow-metering curve of the plurality of flow-metering curves to the target flow-metering curve in response to a change in the vehicle speed. The plurality of flow-metering curves comprises a number of intermediate curves between the initial flow-metering curve and the target flow-metering curve. The controller unit is adapted to step sequentially through each intermediate curve during the transition from the initial flow-metering curve to the target flow-metering curve, thereby providing a smooth transition therebetween. An associated method is disclosed.

The controller unit selects a flow-metering curve that will establish an appropriate steering ratio for the current speed of the work vehicle. Exemplarily, the plurality of flow-metering curves comprises first, second, and third base curves representing, in order, decreasing steering ratios. The controller unit selects the first base curve if the vehicle speed is less than a predetermined first speed threshold (e.g., the work vehicle is operating in a "working mode"), the second base curve if the vehicle speed is between the predetermined first speed threshold and a second speed threshold greater than the predetermined first speed threshold (e.g., the work vehicle is operating in an "intermediate mode"), and the third base curve if the vehicle speed exceeds the second speed threshold (e.g. the work vehicle is operating in a "roading or transport mode").

Further exemplarily, the plurality of flow-metering curves comprises a number of intermediate curves between the first and second base curves and a number of intermediate curves between the second and third base curves. The controller unit steps sequentially through each intermediate curve between the first and second base curves when there is a transition between the first and second base curves, through each intermediate curve between the second and third base curves when there is a transition between the second and third base curves, and through each intermediate curve between the first and second base curves, the second base curve, and each intermediate curve between the second and third base curves when there is a transition between the first and third base curves. The controller unit pauses for a predetermined period of time (e.g., 1 second) between each step.

Such a steering system is particularly useful to effect electrohydraulic joystick steering. In such a case, the steering input device has a joystick which can be manipulated by an operator to produce a joystick steering input and a representative joystick steering input signal.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
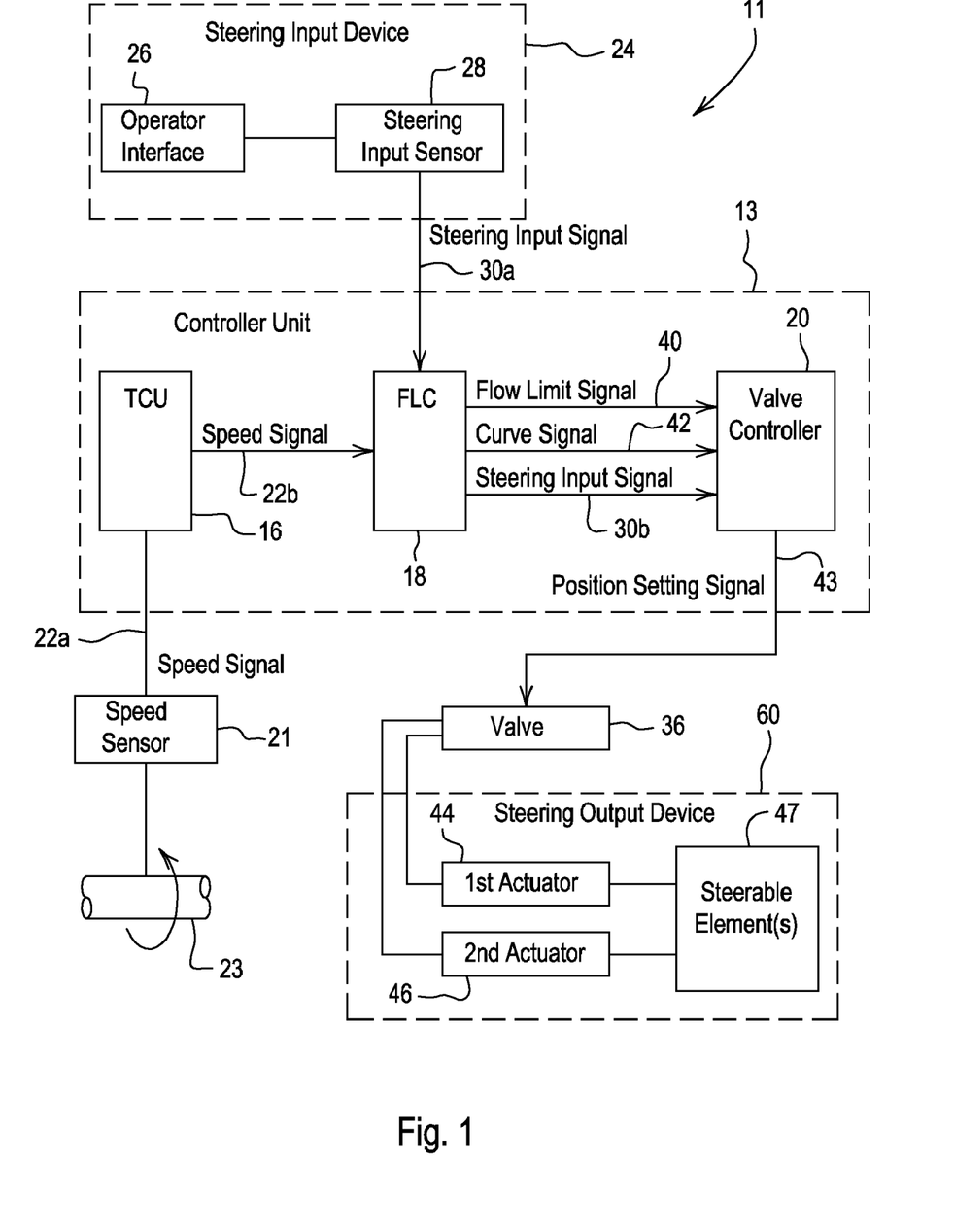
FIG. 1 is a simplified block diagram of a steering system of a work vehicle.
Figure 2:
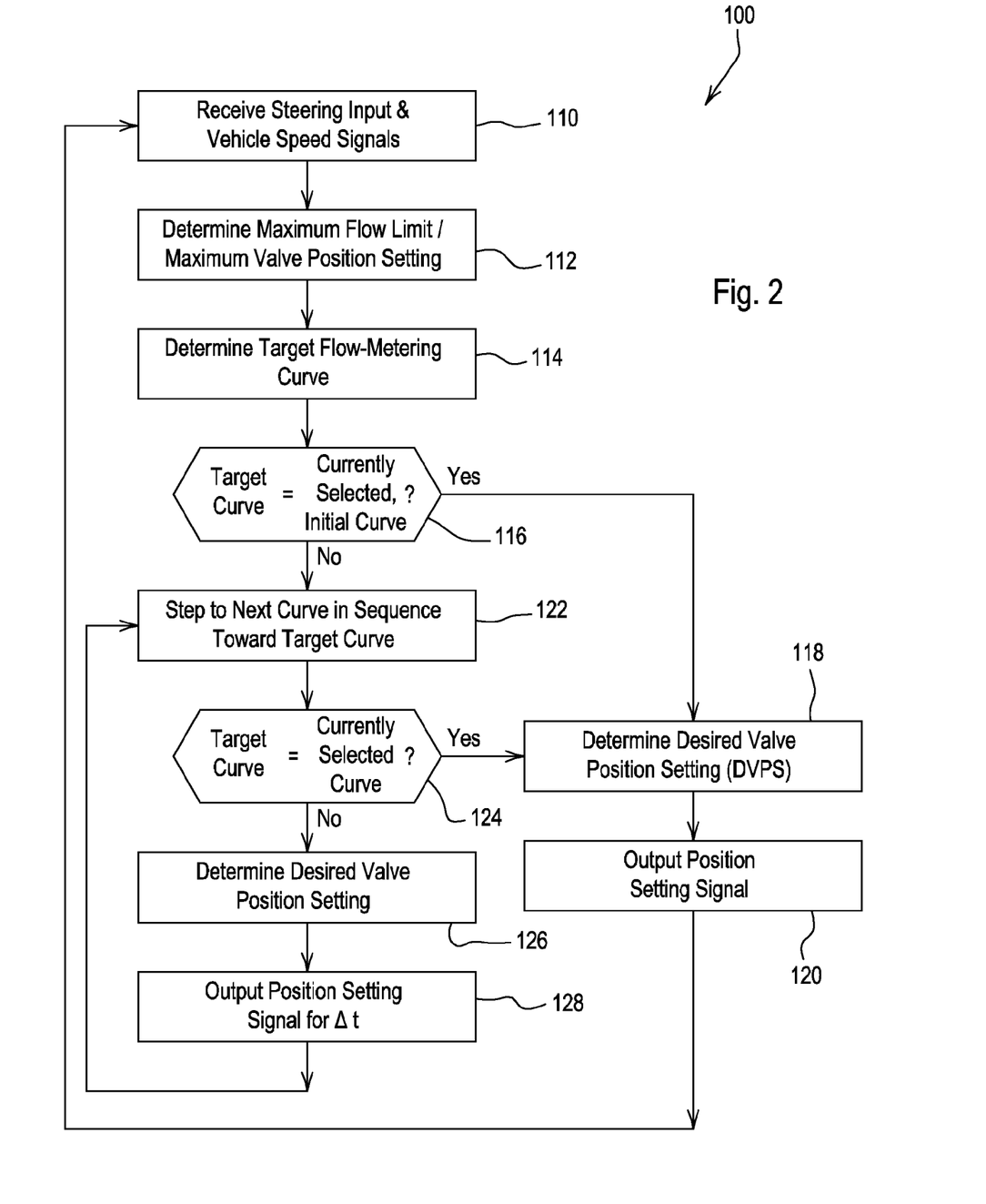
FIG. 2 is a flow chart of control routine for operating the steering system.
Figure 6:
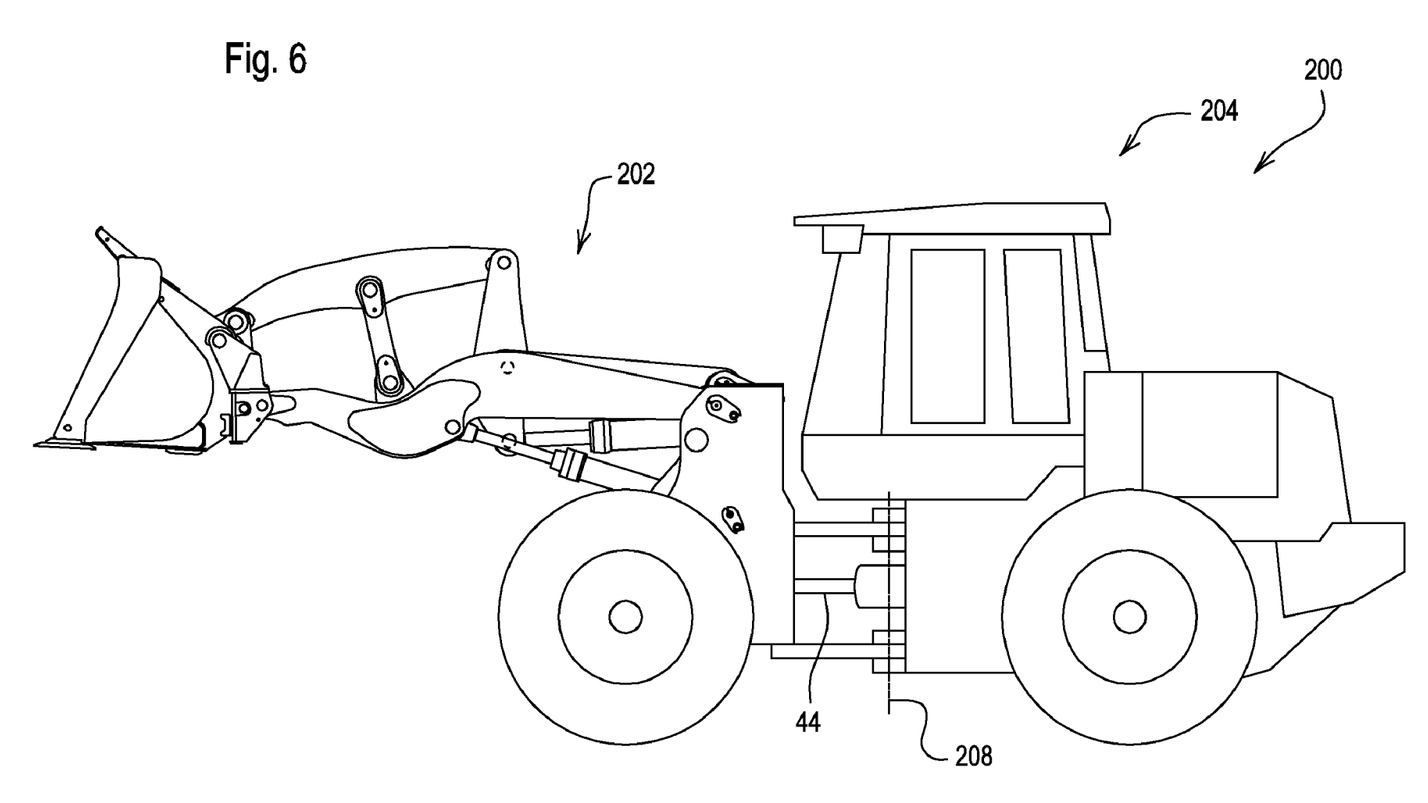
FIG. 6 is a side elevation view of a work vehicle in the form of, for example, a loader on which the steering system may be implemented.

A work vehicle 11 having a steering system 12 is shown in FIG. 1, and a control routine 100 for control of the steering system 12 is shown in FIG. 2. The work vehicle 11 may be configured in a variety of ways. For example, it may be configured as a construction vehicle, a forestry vehicle, or an agricultural vehicle. The steering system 12 is particularly useful with a four-wheel loader, as shown in FIG. 6.

The steering system 12 comprises a controller unit 14 configured to adjust the steering ratio of the steering system in response to changes in the speed of the work vehicle 11. The controller unit 14 may have a single controller, or a plurality of controllers as in the exemplary embodiment of FIG. 1, each controller having a processor and a memory having stored therein a plurality of instructions which, when executed by the processor, causes the processor to perform various functions mentioned herein. In the exemplary embodiment of FIG. 1, the controller unit 14 has a transmission controller 16 (or transmission control unit, "TCU"), a flex load controller 18 ("FLC"), and a valve controller 20 for controlling a hydraulic steering valve 36.

The transmission controller 16 receives a speed signal 22*a* representative of the speed of the vehicle 11 (i.e., the ground speed). A speed sensor 21 senses the rotation speed of an output shaft 23 of a transmission of the vehicle 11, the shaft rotation speed being representative of the vehicle speed. The speed sensor 21 transmits the speed signal 22*a* to the transmission controller 16 which, in turn, transmits a corresponding CAN speed signal 22*b* to the FLC 18 via a CAN bus.

The FLC 18 also receives a steering input signal 30*a* from a steering input device 24. The steering input device 24 has an operator interface 26 for receiving a steering input from an operator to steer the vehicle 11 left and right and a steering input sensor 28 for sensing the steering input applied to the operator interface 26. The operator interface 26 may be, for example, a joystick or a steering wheel, each of which is displaceable upon manipulation by the operator. The steering input sensor 28 acts as a position sensor to sense such steering input and generate the steering input signal 30*a* representative thereof. The FLC, in turn, generates and transmits a CAN steering input signal 30*b* to the valve controller 20 via the CAN bus for use thereby in the control of the steering valve 36.

Thus, in act 110 of the control routine 100 shown in FIG. 2, the FLC 18 receives the speed signal 22*a* from the transmission controller 16 and the steering input signal 30*a* from the sensor 28. The control routine 100 then advances to act 112.

In act 112, the FLC 18 determines a maximum flow limit for the steering valve 36 using the vehicle speed. This maximum flow limit is determined according to the exemplary relationship illustrated in FIG. 3 between vehicle speed and the maximum flow limit. The maximum flow limit is quantified as a percentage of valve opening. Stated otherwise, the maximum flow limit is the maximum extent to which the valve 36 is allowed to open (i.e., the maximum valve position setting), and thus defines the maximum percentage of flow to be allowed by the valve 36. The valve opening, or flow output, range is between 0% (i.e., no-flow state/fully closed position) and 100% (i.e., maximum flow state/fully opened position). Illustratively, at lower speeds, the maximum flow limit/maximum valve position setting is 100% (i.e., the valve 36 is fully opened so as to output its maximum amount of flow). As the speed increases, the maximum flow limit/maximum valve position setting decreases to a lower value such as about 52% (partially opened/closed).

Figure 3:
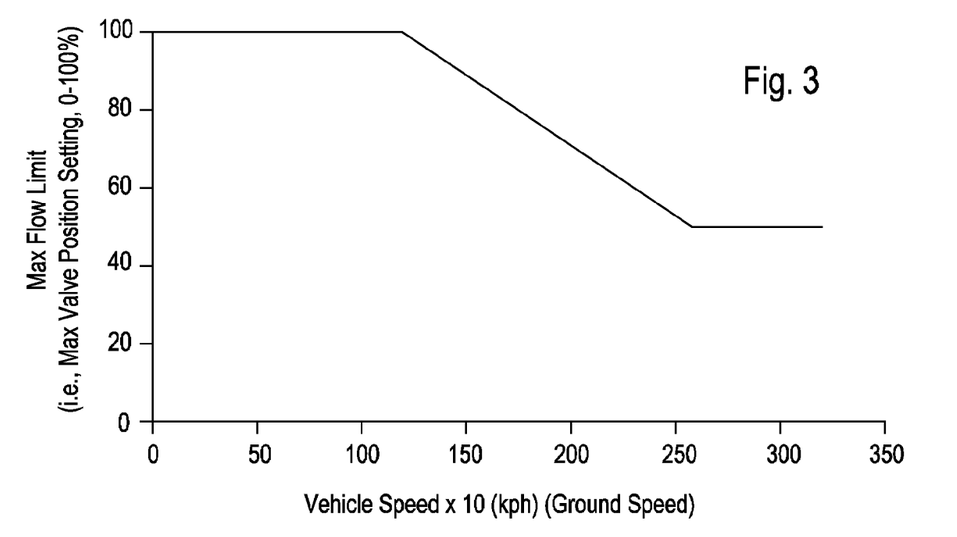
FIG. 3 is a graph relating vehicle ground speed and a maximum hydraulic flow limit.

Thus, generally speaking, as the vehicle speed increases, the maximum extent to which the steering valve 36 can open decreases, thereby correspondingly limiting the steering ratio for higher vehicle speeds. The FLC 18 generates a CAN flow limit signal 40 representative of the maximum flow limit/maximum valve position setting and transmits this signal 40 to the valve controller 20 via the CAN bus for use thereby in the control of the steering valve 36. The valve controller 20 uses this information to control the valve 36 so that the percentage of valve opening/allowed flow remains at or below the maximum flow limit/maximum valve position setting.

Using the vehicle speed, the FLC 18 selects a flow-metering curve among a plurality of flow-metering curves. In particular, the FLC 18 has instructions stored in a memory thereof such that the FLC 18 determines which flow-metering curve among the plurality of flow-metering curves is applicable and to be selected and thus activated for a given, current speed of the vehicle 11. After selecting one of the curves, the FLC 18 generates a curve signal 42 representative of the selected flow-metering curve and transmits this signal 42 to the valve controller 20 for use thereby in controlling the steering valve 36. The curve selection process and use of the selected flow-metering curve by the valve controller 20 is discussed in more detail below.

The flow-metering curves represent different steering ratios possible for the vehicle 11. The controller unit 13 may employ any suitable number of flow-metering curves depending, for example, on the type of work vehicle 11 and resolution of control desired. For example, in the loader application of FIG. 6, the controller unit 13 may employ flow-metering curves 5, 6, 7, 8, 9, and 10 shown generally in FIG. 4. Each flow-metering curve defines what the valve position setting is to be for a given steering input (i.e., displacement of operator interface 26), which correspondingly defines the steering output of a steering output device 60 of the vehicle 11 and thus the steering ratio. Curve 5 represents the largest steering ratio, whereas curve 10 represents the smallest steering ratio, the other curves 6, 7, 8, and 9 representing steering ratios therebetween.

In act 114, the curve selection process begins with the FLC 18 determining a target flow-metering curve among the plurality of flow-metering curves (e.g., curves 5, 6, 7, 8, 9, and 10). It does so by use of any predetermined speed criteria suitable for the particular application at hand. In an example, curves 5, 7, and 10 may be identified as base curves, the other curves 6, 8, and 9 being identified as intermediate curves due to their positions between the respective base curves. As such, according to exemplary speed criteria, the FLC 18 determines that base curve 5 is to be the target curve if the vehicle speed is less than a predetermined lower first speed threshold, that base curve 7 is to be the target curve if the vehicle speed is between the predetermined first speed threshold and a predetermined higher second speed threshold greater than the predetermined first speed threshold, and that base curve 10 is to be the target curve if the vehicle speed exceeds the second speed threshold. After determining the target curve, the control routine advances to act 116.

In act 116, the FLC 18 determines whether the target curve is the same as the curve currently selected by the FLC 18 to be active, i.e., represented by the curve signal 42 transmitted to the valve controller 20. If yes, the FLC 18 continues to select that curve as the selected flow-metering curve and to generate and transmit the curve signal 42 representative of that curve to the valve controller 20 for use thereby, and advances to act 118. If no, the control routine 100 advances to act 122.

In act 118, the valve controller 20 determines a desired valve position setting for the steering valve 36 to control the flow output therefrom. In so doing, the valve controller 20 uses the steering input represented by the steering input signal 30b from the FLC 18, the selected flow-metering curve represented by the curve signal 42, and the maximum flow limit/maximum valve position setting represented by the flow limit signal 40.

Figure 2A:
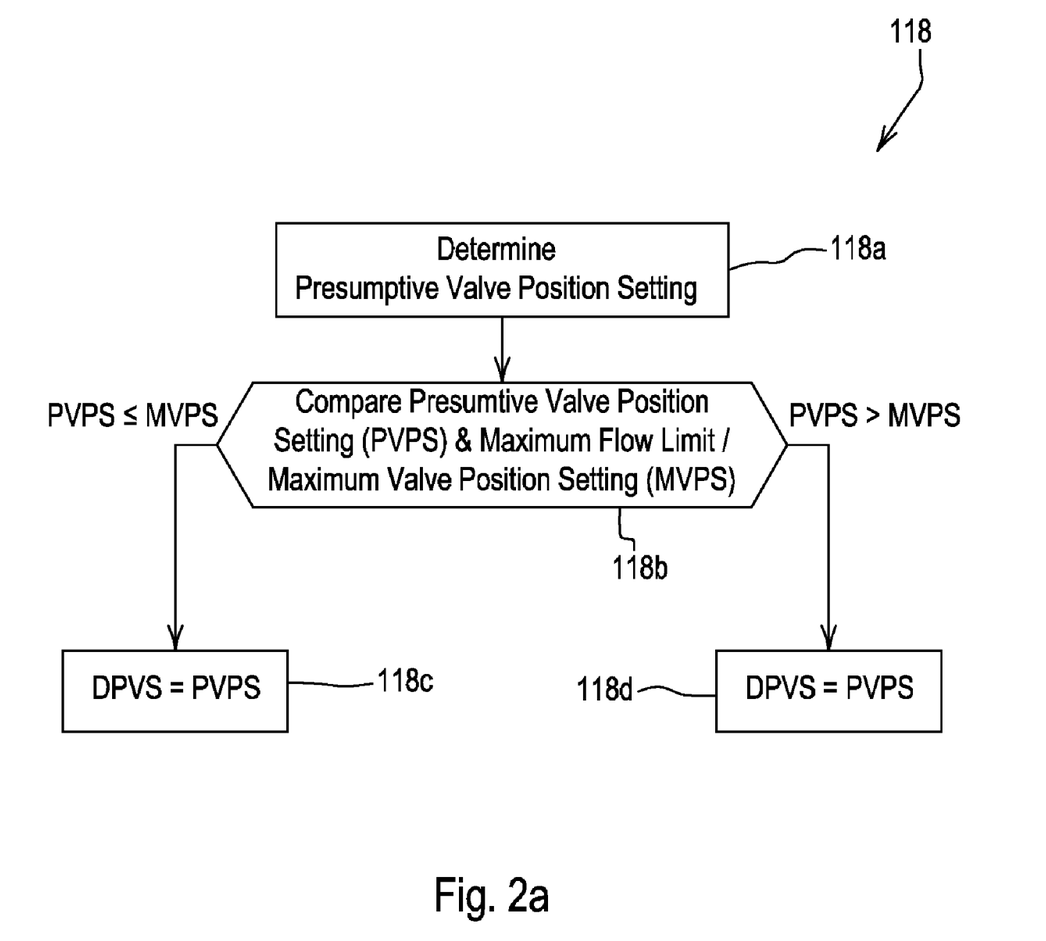
FIG. 2a is an expanded flow chart of an act of the control routine shown in FIG. 2.
Figure 4:
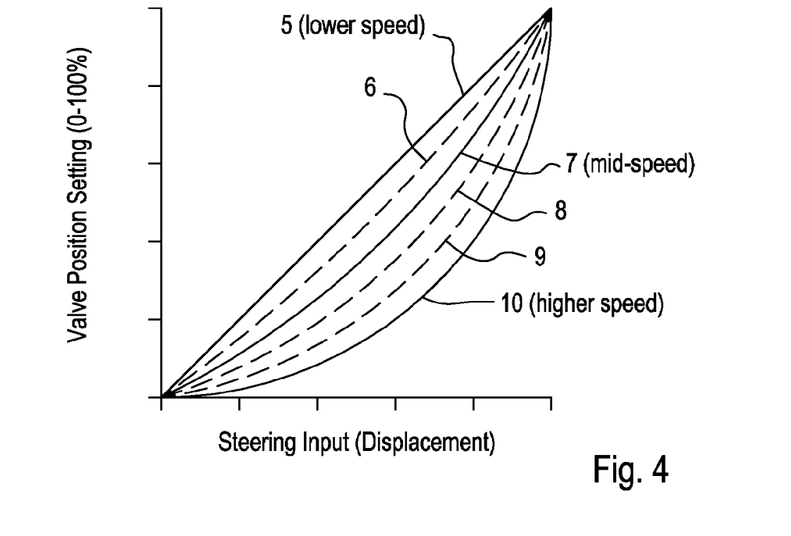
FIG. 4 is a graph illustrating flow-metering curves.

More particularly, referring to FIG. 2a, in act 118a, the valve controller 20 uses the steering input and the selected flow-metering curve to determine a presumptive valve position setting, exemplarily according to the relationship illustrated in FIG. 4. In act 118b, the valve controller 20 determines if the presumptive valve position setting or the maximum flow limit/maximum valve position setting is to be selected as the desired valve position setting by comparing the presumptive valve position setting and the maximum flow limit/maximum valve position setting. If the presumptive valve position setting is less than (i.e., less open than) or equal to the maximum flow limit/maximum valve position setting, the control routine 100 advances to act 118c in which the valve controller 20 selects the presumptive valve position setting as the desired valve position setting. On the other hand, if the presumptive valve position setting is greater than (i.e., more open than) the maximum flow limit/maximum valve position setting, the control routine 100 advances to act 118d in which the valve controller 20 selects the maximum flow limit/maximum valve position setting as the desired valve position setting. The control routine 100 then advances to act 120.

Referring back to FIG. 2, in act 120, the valve controller 20 outputs a position setting signal 43 so as to command that the steering valve 36 assume the desired valve position setting to effect a corresponding steering output by the steering output device 60. Afterwards, the control routine 100 returns to act 110, such that the FLC 18 continues to receive the steering input signal 30a and speed signal 22b, in order to make adjustments in the signals 30b, 40, 42 outputted thereby as needed.

The steering valve 36, in turn, controls flow of hydraulic fluid to first and second actuators 44, 46 (e.g., hydraulic cylinders) of the steering output device 60 for manipulating one or more steerable elements 47 (e.g., articulated section of the body of the vehicle 11, wheels) to steer the vehicle 11 left and right. The actuators 44, 46 may be particularly useful in a vehicle, such a four-wheel drive loader 200 shown, for example, in FIG. 6. In such a case, the actuators 44, 46 may be left and right hydraulic cylinders extending between articulated front and rear sections 202, 204 of the vehicle 200 connected at an articulation joint 206 for movement about an articulation axis 208 to steer the front section 202 left and right relative to the rear section 204. Exemplarily, there may be more than one valve 36 under the control of the valve controller 20, such as two valves, one for each actuator 44, 46. Further exemplarily, there may be only one actuator, or in some cases more than two actuators.

If the target curve is not the same as the currently selected, initial curve, the control routine 100 transitions to the target curve from the initial curve. Such a transition may be initiated upon a change in the vehicle speed. Generally speaking, during a transition from one base curve to the target base curve, the controller unit 11 steps sequentially through each intermediate curve, and pauses for a predetermined period of time between each step (e.g., 1 second). Stated otherwise, the controller unit 11 remains at each step between the initial curve and the target curve for the predetermined period of time.

During the transition, in act 122, the FLC 18 steps to the next curve in the sequence toward the target curve so that the selected curve becomes this next curve. The control routine 100 then advances to act 124.

After the step in act 122, in act 124, the FLC 18 determines whether the newly selected curve is now the target curve. If yes, the control routine 100 advances to act 118. If no, the control routine 100 advances to act 126.

In act 126, the valve controller 20 determines a desired valve position setting for the steering valve 36 in a manner similar to what was described above in connection with act 118. The control routine 100 then advances to act 128.

In act 128, the valve controller 20 outputs a position setting signal 43 so as to command that the steering valve 36 assume the desired valve position setting to effect a corresponding steering output by the steering output device 60. The position setting signal 43 is outputted for the predetermined period of time (e.g., 1 second), after which the control routine returns to act 122 to take the next curve step toward the target curve.

Figure 5:
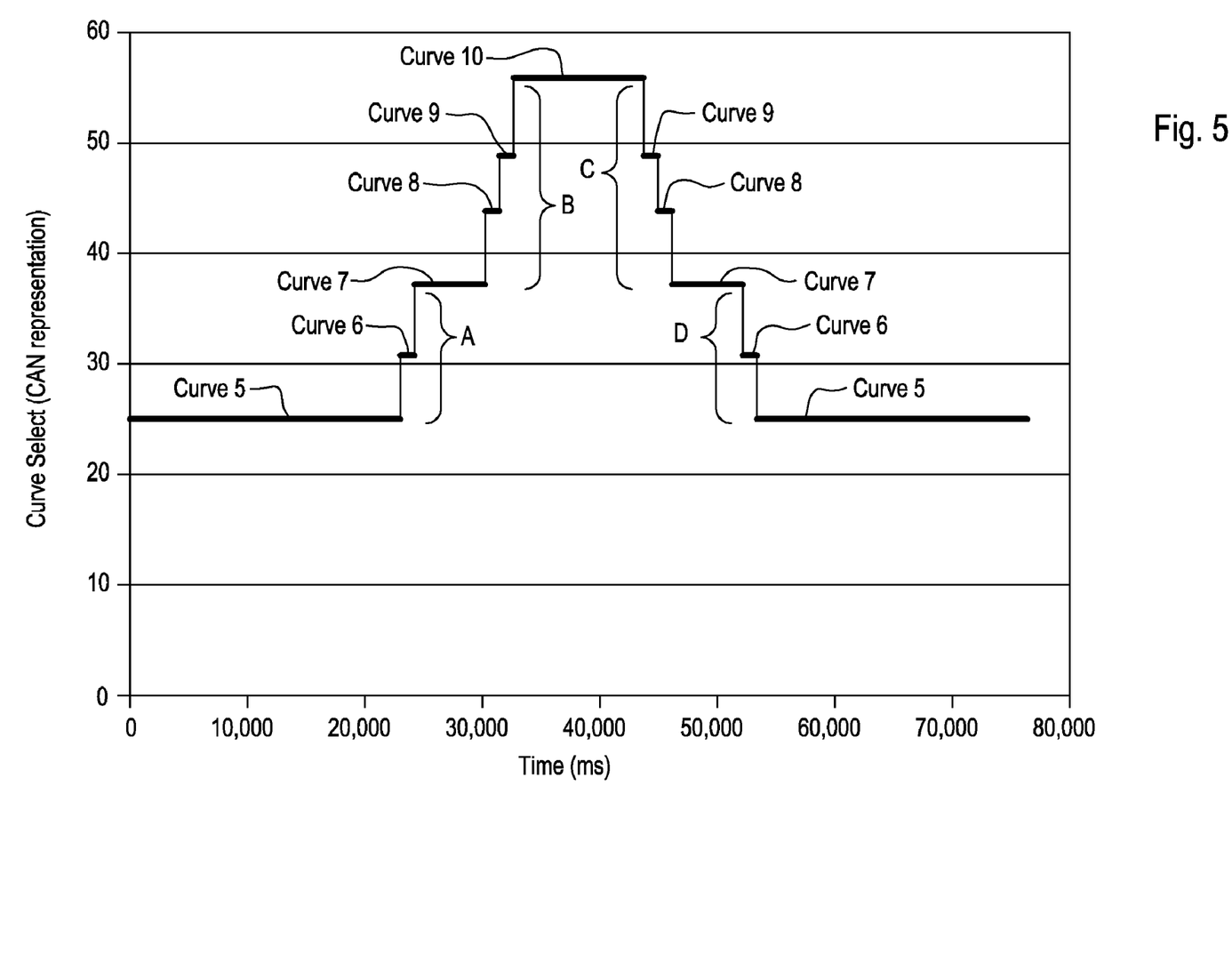
FIG. 5 is a graph relating time and curve selection.

The curve transition process between base curves may be described further in connection with FIG. 5. For example, starting at lower base curve 5, if the vehicle speed exceeds the predetermined first speed threshold (e.g., 7.5 mph), the FLC 18 enters a transition phase in which it increments the flow-metering curve by 1 each second until it reaches curve 7, the mid-speed base curve. More particularly, the FLC 18 steps from curve 5 to curve 6 and then from curve 6 to curve 7, allowing the predetermined period of time (e.g., one second) to elapse between each step. This transition is illustrated in FIG. 5 by transition zone A. If the vehicle speed remains between the first and second speed thresholds, base curve 7 will remain the selected/active curve. Curve 7 represents less displacement sensitivity than curve 5, suitable for mid-range speeds.

If the vehicle speed exceeds the second speed threshold (e.g., 14 mph), the FLC 18 enters another transition phase, incrementing the flow-metering curve by 1 each second until it reaches curve 10, the higher-speed base curve. In particular, the FLC 18 steps from curve 7 to curve 8, curve 9, and then curve 10, allowing the predetermined period of time (e.g., one second) to elapse between each step. This transition is illustrated in FIG. 5 by transition zone B. Curve 10 represents even less displacement sensitivity than curve 7 so as to be more suitable for higher speeds.

During speed decreases, the FLC 18 steps in reverse between the base curves as illustrated by transition zones C and D in FIG. 5.

While the disclosure has been illustrated and described in detail in the drawings and foregoing description, such an illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method of operating a steering system of a work vehicle, comprising:
sensing a steering input and a speed of the work vehicle,
selecting a flow-metering curve among a plurality of flow-metering curves representing different steering ratios using the vehicle speed, steering ratio defined as steering output/steering input, determining a desired valve position setting for a steering valve using the steering input and the selected flow-metering curve, and commanding that the steering valve assume the desired valve position setting to effect a corresponding steering output, wherein the selecting comprises determining a target flow-metering curve among the plurality of flow-metering curves and transitioning from an initial flow-metering curve of the plurality of flow-metering curves to the target flow-metering curve in response to a change in the vehicle speed, the plurality of flow-metering curves comprises a number of intermediate curves between the initial flow-metering curve and the target flow-metering curve, and the transitioning comprises stepping sequentially through each intermediate curve.

2. The method of claim 1, wherein the sensing comprises sensing a joystick steering input, and the determining comprises determining the desired valve position setting using the joystick steering input.

3. The method of claim 1, wherein the stepping comprises pausing for a predetermined period of time between each step.

4. The method of claim 1, wherein the plurality of flow-metering curves comprises first and second base curves representing, in order, decreasing steering ratios, and the selecting comprises selecting the first base curve if the vehicle speed is within a lower speed range and the second base curve if the vehicle speed is within a higher speed range.

5. The method of claim 1, wherein the plurality of flow-metering curves comprises first, second, and third base curves representing, in order, decreasing steering ratios, and the selecting comprises selecting the first base curve if the vehicle speed is less than a predetermined first speed threshold, the second base curve if the vehicle speed is between the predetermined first speed threshold and a second speed threshold greater than the predetermined first speed threshold, and the third base curve if the vehicle speed exceeds the second speed threshold.

6. The method of claim 5, wherein the plurality of flow-metering curves comprises a number of intermediate curves between the first and second base curves and a number of intermediate curves between the second and third base curves, and the selecting comprises stepping sequentially through each intermediate curve between the first and second base curves when there is a transition between the first and second base curves, through each intermediate curve between the second and third base curves when there is a transition between the second and third base curves, and through each intermediate curve between the first and second base curves, the second base curve, and each intermediate curve between the second and third base curves when there is a transition between the first and third base curves.

7. The method of claim 1, wherein the determining comprises determining a maximum flow limit for the steering valve using the vehicle speed.

8. The method of claim 7, wherein the maximum flow limit corresponds to a maximum valve position setting, the determining comprises determining a presumptive valve position setting using the steering input and the selected flow-metering curve, comparing the presumptive valve position setting and the maximum valve position setting, and selecting the maximum valve position setting as the desired valve position setting if the presumptive valve position setting is greater than the maximum valve position setting.

9. A steering system for a work vehicle, the steering system comprising:

a steering input device for receiving and sensing a steering input and generating a steering input signal representative thereof, a speed sensor for sensing a speed of the work vehicle and generating a speed signal representative thereof, a steering valve, a controller unit adapted to:

receive the steering input signal and the speed signal, select a flow-metering curve among a plurality of flow-metering curves representing different steering ratios using the speed signal and generate a selected flow-metering curve signal representative of the selected flow-metering curve, steering ratio defined as steering output/steering input, determine a desired valve position setting for the steering valve using the steering input signal and the selected flow-metering curve signal, and output a position setting signal so as to command that the steering valve assume the desired valve position setting to effect a corresponding steering output, wherein the controller unit is adapted to determine a target flow-metering curve among the plurality of flow-metering curves and transition from an initial flow-metering curve of the plurality of flow-metering curves to the target flow-metering curve in response to a change in the vehicle speed, the plurality of flow-metering curves comprises a number of intermediate curves between the initial flow-metering curve and the target flow-metering curve, and the controller unit is adapted to step sequentially through each intermediate curve during the transition from the initial flow-metering curve to the target flow-metering curve.

10. The steering system of claim 9, wherein the steering input device comprises a joystick such that the steering input is a joystick steering input and the steering input signal is a joystick steering input signal representative of the joystick steering input, and the controller unit is adapted to determine the desired valve position setting using the joystick steering input signal.

11. The steering system of claim 9, wherein the controller unit is adapted to pause for a predetermined period of time between each step.

12. The steering system of claim 9, wherein the plurality of flow-metering curves comprises first and second base curves representing, in order, decreasing steering ratios, and the controller unit is adapted to select the first base curve if the vehicle speed is within a lower speed range and the second base curve if the vehicle speed is within a higher speed range.

13. The steering system of claim 9, wherein the plurality of flow-metering curves comprises first, second, and third base curves representing, in order, decreasing steering ratios, and the controller unit is adapted to select the first base curve if the vehicle speed is less than a predetermined first speed threshold, the second base curve if the vehicle speed is between the predetermined first speed threshold and a second speed threshold greater than the predetermined first speed threshold, and the third base curve if the vehicle speed exceeds the second speed threshold.

14. The steering system of claim 13, wherein the plurality of flow-metering curves comprises a number of intermediate curves between the first and second base curves and a number of intermediate curves between the second and third base curves, and the controller unit is adapted to step sequentially through each intermediate curve between the first and second base curves when there is a transition between the first and second base curves, through each intermediate curve between the second and third base curves when there is a transition between the second and third base curves, and through each intermediate curve between the first and second base curves, the second base curve, and each intermediate curve between the second and third base curves when there is a transition between the first and third base curves.

15. The steering system of claim 9, wherein the controller unit is adapted to determine a maximum flow limit for the steering valve using the vehicle speed.

16. The steering system of claim 15, wherein the maximum flow limit corresponds to a maximum valve position setting, the controller unit is adapted to determine a presumptive valve position setting using the steering input and the selected flow-metering curve, compare the presumptive valve position setting and the maximum valve position setting, and select the maximum valve position setting as the desired valve position setting if the presumptive valve position setting is greater than the maximum valve position setting.

17. A work vehicle comprising the steering system of claim 9.

* * * * *